United States Patent
Marshall

[15] 3,665,989
[45] May 30, 1972

[54] TIRE STAND

[72] Inventor: Don J. Marshall, Edgewater, Md.

[73] Assignee: Goodall Semi-Metallic Hose and Mfg. Co., Philadelphia, Pa.

[22] Filed: Nov. 23, 1970

[21] Appl. No.: 91,926

[52] U.S. Cl. .................................144/288 A, 157/1.1
[51] Int. Cl. ..........................................B25h 5/00
[58] Field of Search.................144/288 A; 157/1, 1.1, 1.11

[56] References Cited

UNITED STATES PATENTS

| | | | |
|---|---|---|---|
| 1,393,319 | 10/1921 | Schlenker | 157/1.11 |
| 1,712,347 | 5/1929 | Homiak | 157/1.11 |
| 3,348,593 | 10/1967 | Turpin | 144/288 A |

Primary Examiner—Frank T. Yost
Attorney—William J. Dick

[57] ABSTRACT

This patent discloses a tire stand for supporting a tire rim, the rim being conventional in that it includes a radially extending peripheral flange portion upon which, for example, an automotive or truck tire may be mounted. The tire stand includes a plurality of feet each of which comprise a rounded base portion, a body portion and a rim seating means which extends from the body portion, the seating means including a pair of spaced arms, the first arm being adapted for engagement of the inner surface of the flange of the rim and the second arm which is spaced from the first arm, being adapted for engagement with the outer surface of the flange, the second arm being foreshortened with respect to the first arm. Interconnecting the feet are spring biasing means which act on each of the feet to effect a gripping action by the feet on the inner and outer surfaces of the flange, the rotational effect upon each of the feet causing the first arm to dig into the interior or the inner surface of the rim and the foreshortened arm to dig into the lip of the rim.

10 Claims, 3 Drawing Figures

Patented May 30, 1972 3,665,989

INVENTOR
DON J. MARSHALL

BY *William J. Dick*
ATTORNEY

TIRE STAND

SUMMARY OF THE INVENTION AND STATE OF THE PRIOR ART

The present invention relates to apparatus for elevating and supporting from a surface an annulus, and more particularly relates to apparatus for elevating and supporting the rim of a wheel of a motor vehicle.

Conventionally, tires are mounted on the rims of wheels by placing the rims on a stand having a central hub supporting member. The rim is secured by the hub supporting member to the stand and then the tire is worked over the rim's upper edge and onto the rim. A band is then inserted circumscribing the tire, the band inflated to squeeze the tire radially inward and air is applied to the tire for inflating the interior of the tire to move the tire bead against the flange portion of the rim and secure the tire to the rim. The band is then released and the tire is inflated to its full pressure. The hub connecting the rim is then uncoupled and the tire is removed from the stand. Such a tire stand as heretofore described is expensive and requires an initial outlay which is oft times more than necessary for the occasional tire that must be mounted on the rim in the ordinary service station. However, conventional work tables or even the floor of the garage is unsatisfactory for mounting tire on the rim because the width of the tire is greater than the maximum width of the rim. Thus placing the rim flat on the floor or on a table and then mounting the tire on the rim causes the side wall of the tire to engage the floor or table surface and move its lowermost engaging lip upwardly towards the central portion of the rim preventing inflation of the tire.

In view of the above, it is a principal object of the present invention to provide an inexpensive tire stand which engages the rim of the wheel and permits the tire to be mounted on the rim without engagement of the side wall of the tire against the floor.

Another object of the present invention is to provide a novel tire stand which is easily adapted for engagement of the rim of a tire regardless of the rim size or configuration.

Still another object of the present invention is to provide a tire stand which includes a plurality of feet which act upon the tire rim to grasp the same firmly in such a manner as to prevent inadvertent displacement of the stand relative to the rim when mounting the tire on the rim.

Other objects and a fuller understanding of the invention may be had by referring to the following specification and claims taken in conjunction with the accompanying drawings in which:

Figure 1:
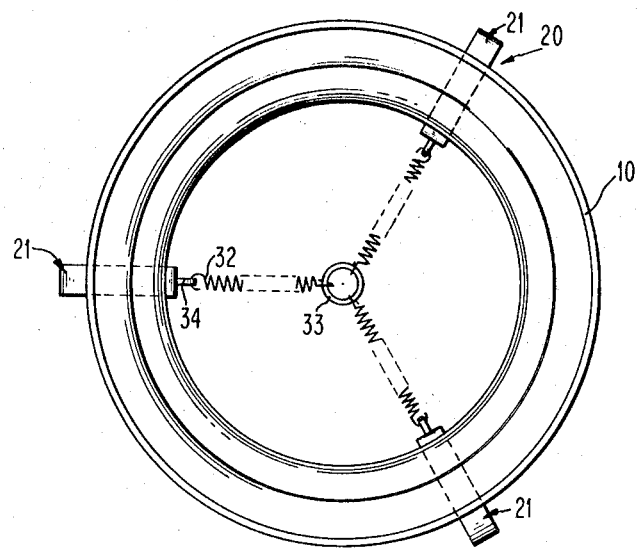
FIG. 1 is a schematic view in plan of a tire or wheel rim supported on a novel stand constructed in accordance with the present invention.

Referring now to the drawing and especially FIG. 1 thereof, a typical wheel rim 10 (schematically shown) is shown being supported by a tripod like tire stand 20 constructed in accordance with the present invention. It should be noted that the lug holes or apertures have been deleted from the drawings for purposes of illustrating the typical rim structure and to illustrate the engagement of the novel tire stand with the rim for supporting the wheel. As illustrated best in FIG. 2, the rim 10 comprises an annulus having substantially symetrical radially extending peripheral flange portions 11 with extended radial terminii 12. As illustrated in phantom the tire 13 is mounted on the rim, the tire having a tread portion 14 and a belly-like side wall 15 which normally extends below and above the terminal ends 12 of the flanges 11 of the annulus or rim 10. As noted the flange has an inner surface 18 and an outer surface 19, the outer surface 19 being generally covered by the tire 13.

In accordance with the invention, the tire stand 20 is adapted to engage the flange while embracing the terminal edge 12 of the flange of the rim 10 and elevated the rim above a generally planar surface 16 (such as a floor or work table surface) in order that the belly or side wall portion 15 of the tire does not engage the planar surface and prevent the tire from seating properly on the outer surface 19 of the flange 11 of the rim 10. To this end, the tire stand comprises a plurality of feet 21 in the present instance each foot being identical, the feet being spaced apart about the periphery or terminal ends 12 of a flange 11 to give a tripod-type support for the rim 10.

Each of the feet 21 engage the peripheral edge of the rim and support the rim above the planar surface 16 so that the side wall 15 of the tire does not rest against the planar surface thereby preventing proper inflation of the tire on the rim. To this end, each of the feet comprise an arcuate base portion 22 which is connected to an upstanding body portion 23 and a rim or flange seating means 24 at the upper portion thereof. As illustrated, the flange seating means comprises a first arm 25 adapted for engagement with the inner surface 18 of the flange 11 and a second arm 26 spaced from the first arm for engaging the outer surface 19 of the flange adjacent the terminus 12 of the flange. Preferably the first arm 25 extends radially upwardly of the flange a greater distance than the second arm 26, for purposes which will become more evident hereinafter.

As explained above the second arm 26 extends from the body portion 23 of the foot 21 a shorter distance than the first arm 25 so as to engage the outer surface 19 of the flange 11 at least adjacent its terminal end. In this manner the second arm's engagement with the interior peripheral and terminal end 15A or bead (common reference) of the tire 13 is in the worst case minimal. Additionally the arms 25 and 26 are spaced apart sufficient distance to form a mouth 27 which merges into an enlarged recess 28 intermediate the arms 25 and 26. Additionally, the arm 26 preferably has at least the terminal end thereof terminating in a beak shaped portion 29 to sharply engage the inner surface 19 of the flange 11 so as to permit the terminal end 12 of the flange 11 to be embraced in the recess 28, and to permit the beak to act as a pivot point for the foot 21 in a manner which will be more fully explained hereinafter. The upper portion of the first arm 25 may include a sloped or inwardly canted face 31 for engagement with the inner surface 18 of the rim 11.

In order to assure firm clamping of the arms 25 and 26 against the inner and outer surfaces 18 and 19 of the flange 11, biasing means engage each of the feet 21 and tend to rotate the foot using the beak 29 of the arm 26 as a pivot, cocking and latching the foot into engagement with the rim by forcing the first arm 25 against the inner surface 18 of the flange 11. To this end, a spring 32 is connected to each of the feet 21, the springs being connected together at a common center as by a ring 33 and coupled in any convenient manner, as by an eye or the like 34 to each of the feet 21. As may readily be apparent to one skilled in the art, other means may be utilized for applying a biasing force to effect the clamping action of the arms 25 and 26 against the flange 11.

Figure 2:
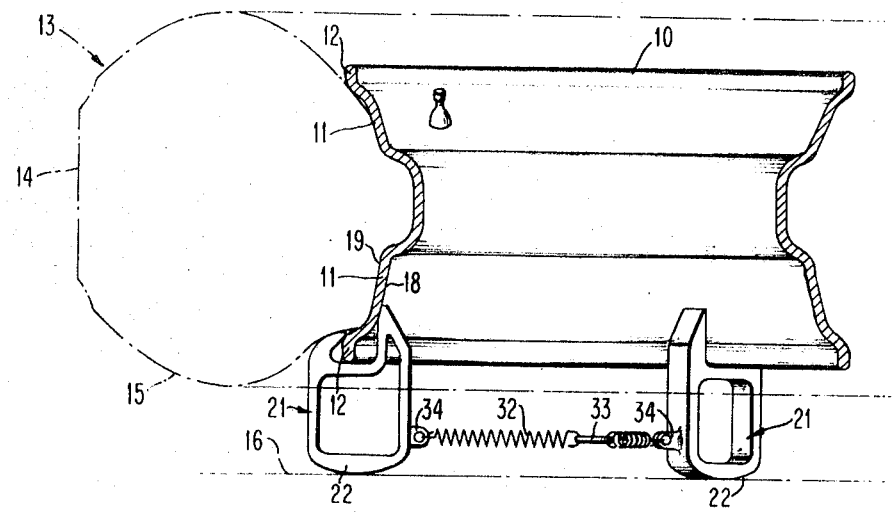
FIG. 2 is a fragmentary sectional view in side elevation illustrating a portion of a typical wheel rim and including in phantom lines a fragmentary portion of a tire.
Figure 3:
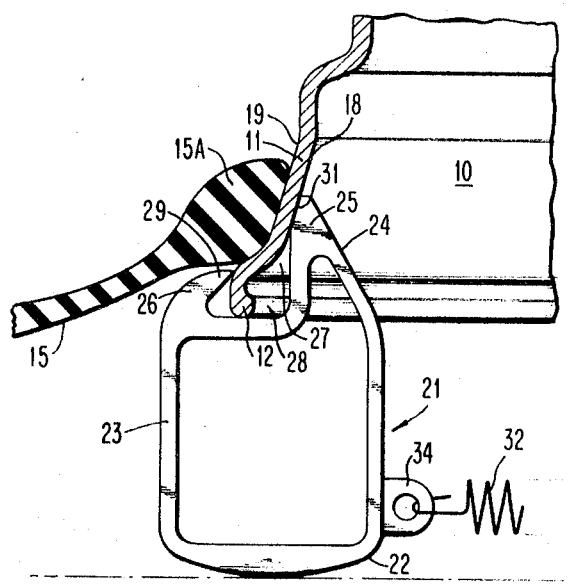
FIG. 3 is an enlarged fragmentary side elevational view of a portion of the tire stand of the present invention and illustrating the relationship between the various portions of the stand and the rim and the tire.

In order to compensate for different rim geometry wherein the flange 11 may flare more inwardly or outwardly from the form illustrated in FIGS. 2 and 3, the base 22 of each of the feet is preferably of an arcuate form, in the present instance convex, in the event that the first arm 25 and the second arm 26 engage different portions of the inner and outer surfaces of the flange 11 of the rim. In this manner the rounded base cooperates with the biasing means or springs 32 to automatically compensate for different rim geometry and line of action differences between the embracing and clamping grip of the arms 25 and 26.

In operation the rim may be turned upside down and each foot positioned so as to permit clamping by the arms 25 and 26 along the flange at different levels, heights or radial extents as heretofore described. As each of the feet 21 is clamped on the rim, pressure is exerted by the biasing means or springs 32 tensioning and causing the cocking action heretofore described.

Thereafter the rim with the stand attached is inverted and the stand is placed on a surface for work. In a like manner when it is desired to disengage the feet 21 from the rim, simple pressure against the biasing springs will cause the arm 25 to disengage from the inner surface of the flange and permit each foot to be removed from the rim.

Thus the apparatus of the present invention provides a tire stand which is easily affixed to the tire and which by its simple construction may be economically made while providing a sturdy fixture for the mounting of tires on rims.

Although the invention has been described with a certain degree of particularity, it is understood that the present disclosure has been made only by way of example and that numerous changes in the structure may be made without departing from the spirit and the scope of the invention as hereinafter claimed.

What is claimed is:

1. Apparatus for supporting an annulus having a radially extending peripheral flange including an inner and outer surface on said flange; said apparatus comprising: a plurality of feet each comprising a base portion, a body portion, and a flange seating means projecting from said body portion; said seating means comprising a first arm and a second arm spaced from said first arm; and biasing means tending to cock said feet for urging said first arm into engagement with the inner surface of said flange and said second arm into engagement with the outer surface of said flange to thereby effect a gripping action by said feet against said flange.

2. Apparatus in accordance with claim 1 wherein said first arm projects outwardly from said body portion farther than said second arm.

3. Apparatus in accordance with claim 2 wherein said second arm and said first arm form a recess with said body portion to receive said flange of said rim.

4. Apparatus in accordance with claim 3 wherein said second arm includes a terminal end spaced from said first arm to form a mouth for said recess, said mouth having a narrower opening than said recess.

5. Apparatus in accordance with claim 2 wherein said second arm includes a beak shaped terminal end.

6. Apparatus in accordance with claim 5 including an inwardly canted face portion on said first arm.

7. Apparatus in accordance with claim 2 including an arcuate base portion.

8. A tripod-like tire stand for supporting the rim of a wheel, said rim comprising a radially extending peripheral flange having an inner and outer surface on said flange, said stand comprising at least three feet for spaced apart connection to said flange of said rim; each of said feet including a convex base portion for engagement with a work surface and an upstanding flange seating means; said seating means comprising first and second arms for engagement respectively with the inner and outer surfaces of said flange; said first arm having a greater length than said second arm whereby said arms engage said flange at different radial extents along said inner and outer surfaces; and biasing means connecting said feet and tending to urge each of said feet inwardly towards the central axis of said rim.

9. A tire stand in accordance with claim 8 including a beak-shaped terminus on said second arm for sharp engagement with said flange adjacent the terminal edge thereof.

10. A tire stand in accordance with claim 8 wherein said biasing means comprises at least one spring means interconnecting said feet.

* * * * *